D. SHAW.

Smut Mill and Grain Separator.

No. 1,564. Reissued Nov. 3, 1863.

N. PETERS, Photo-Lithographer, Washington, D. C.

UNITED STATES PATENT OFFICE.

DANIEL SHAW, OF CHICAGO, ILLINOIS.

IMPROVEMENT IN SMUT-MILLS AND GRAIN-SEPARATORS.

Specification forming part of Letters Patent No. 8,861, dated April 6, 1852; Reissue No. 1,564, dated November 3, 1863.

*To all whom it may concern:*

Be it known that I, DANIEL SHAW, of the city of Chicago, in the county of Cook, and the State of Illinois, have discovered and invented a new and useful Combination of a Smut-Mill with an Exhaust-Fan Grain-Separator, by which combination I accomplish the new and useful results and advantages below specifically set forth.

The nature of my invention consists in attaching both the smut-mill and the grain-separator to a single upright rotary shaft, and operating the two machines by a single application of motive power to such shaft, and thereby both scouring and separating the grain by a single process through the combined machine. I effect my said combination by constructing in any known form a smut-mill at or near the top of such upright rotary shaft, and an exhausting-fan at or near the bottom of such shaft, inclosing said fan, and elevating the air-spout thereof, and curving the same over the smut-mill, forming at some convenient point such a connection that the grain, after being scoured in the smut-mill, may pass out into the air-spout and be separated from the refuse material.

By my said combination I accomplish the following, among other new and useful results, viz: First, I operate both a smut-mill and a grain-separator by a single application of motive power; second, I both scour the grain in the smut-mill and separate it from the cheat and other imperfect material in the grain-separator by a single process through the combined machine; third, I save a portion of the space which would be occupied by the two machines separately; fourth, I save a portion of the expense of constructing the two machines separately; fifth, I save a portion of the expense of operating the two machines separately; sixth, I effect the more convenient scouring and separating of the grain; seventh, I effect the discharge of the dirt and smut from the smut-mill through the exhaust-fan into the open air, thus securing much greater cleanliness, comfort, and convenience where the machine is operated.

To enable any person skilled in the art or science to which my said discovery and invention appertains, or to or with which it is most nearly connected, to construct and use the same, I give the following description of its construction and operation, which I do hereby declare to be a full and exact description thereof, reference being had to the accompany drawings, according to the letters of reference marked thereon.

Figure 2:
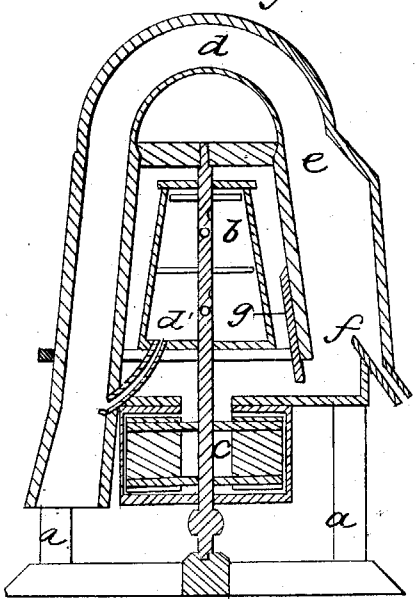
Figure 1:
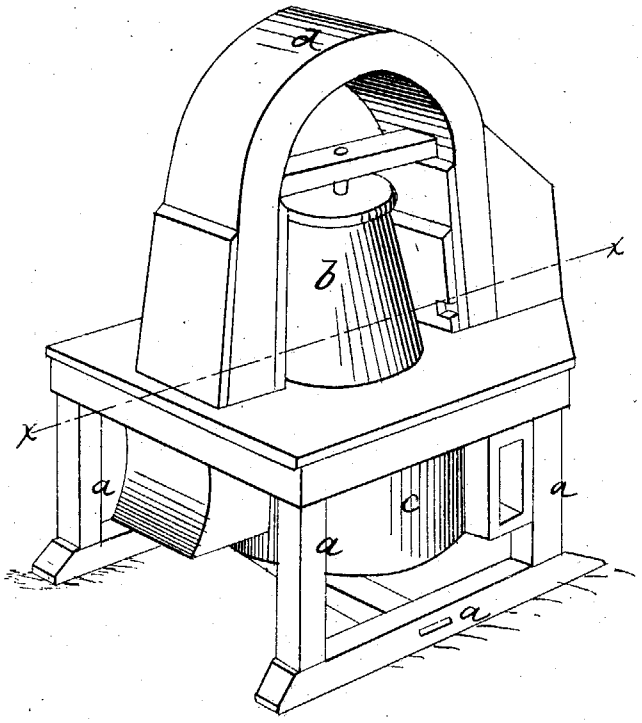

Figure 1 is an isometrical view; Fig. 2, a vertical section through the line *x x*, in each of which views, where the same parts are seen, they are designated by the same letters of reference.

*A A* is the main frame and table which supports the whole machine; *b*, the smut-mill, which consists of a conical case, with beaters projecting from an upright rotary shaft.

*c* is the fan-case, placed immediately under the smut-mill. The fan is attached to the same rotary shaft as the smut-beaters, but the smut-mill and the fan grain-separator have no communication with each other.

The trunk *d* is the air-spout of the grain-separator, and descends as low on one side as the bottom of the fan-case, and rises thence, and is curved or arched over the smut-mill, descending on the other side. At about the commencement of the arch on such other side I form an offset so as to increase the air-spout to about double its size to that point, and extend it so enlarged down to its communication with the fan-case, as shown in the drawings. At or near the point *e*, I place a wire-gauze screen, leaving a convenient space between the end of the screen and the side of the air-spout. At *f* is a spout from the air-trunk for the discharge of the grain, &c. As the grain passes from the smut-mill through the spout *d* those particles which are too light to fall out at the mouth of the air-spout ascend the same with the cheat, smut, &c., and as they come in contact with the screen the smut, dust, &c., are drawn through it, while the light grain, cheat, and chaff pass over and fall down through the spout *f*, and in its descent from the screen to the spout *f* the chaff, &c., being the lighter, is separated from the cheat and grain and drawn into the fan-case, and thence discharged out into the open air.

*g* is an adjustable slide, which opens or closes the passage to the fan, thereby regulating the force of the current of air.

I do not claim the invention or discovery of either of said machines when separately constructed and operated; but What I do claim, and desire to secure by Letters Patent, is—

The combination and joint operation of a smut-mill and an exhaust-fan grain-separator, substantially as herein specified and set forth.

DANIEL SHAW.

Witnesses:
P. A. HAYNE,
CHAS. W. GRIGGS.